(12) United States Patent
Chane-Ching

(10) Patent No.: US 6,866,925 B1
(45) Date of Patent: Mar. 15, 2005

(54) MESOSTRUCTURED MATERIAL INCORPORATING PARTICLES OF NANOMETRIC DIMENSIONS

(75) Inventor: Jean-Yves Chane-Ching, Aubonne (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 149 days.

(21) Appl. No.: 10/111,915

(22) PCT Filed: Nov. 2, 2000

(86) PCT No.: PCT/FR00/03060

§ 371 (c)(1),
(2), (4) Date: Jul. 24, 2002

(87) PCT Pub. No.: WO01/32558

PCT Pub. Date: May 10, 2001

(30) Foreign Application Priority Data

Nov. 2, 1999 (FR) .............................. 99 13678

(51) Int. Cl.$^7$ ................................ B32B 3/26

(52) U.S. Cl. .............................. 428/304.4; 428/307.3; 428/307.7; 428/312.6; 428/312.8; 428/312.2; 428/314.2; 428/314.8; 428/315.7; 428/319.1; 428/323; 428/331; 428/446; 428/402; 428/702; 423/335; 423/326; 423/327.1; 423/328.2; 423/592.1

(58) Field of Search .................. 428/304.4, 307.3, 428/307.7, 312.6, 312.8, 312.2, 314.2, 314.8, 315.7, 319.1, 323, 331, 446, 402, 702; 423/335, 326, 327.1, 328.2, 592.1

(56) References Cited

PUBLICATIONS

Jin–Seung Jung et al., *Materials Research Bulletin*, Jul. 1, 1999, Elsevier, USA, vol. 34, No. 9, pp. 1353–1360.
Huijuan Zhou et al., *Materials Research Bulletin*, Apr. 1999, Elsevier, USA, vol. 34, No. 6, pp. 845–849.
Hirai T. et al., *J. of Physical Chemistry* B, May 27, 1999, ACS, USA, vol. 103, No. 21, pp. 4228–4230.
Koehn R. et al., *Proceedings of the 1998 Mrs. Fall Meeting—Symposium on Solid–State Chemistry of Inorganic Materials II*; Boston, MA, USA, Nov. 30–Dec. 4, 1998, vol. 547, pp. 81–86.
Sasaki Makoto et al., *Proceedings of the 1997 International Symposium on Zeolites and Microporous Crystals*, Tokyo, Japan, Aug. 24–27, 1997, vol. 21, Nos. 4–6, pp. 597–606.
Database WPI, Sechion CH, Week 199951, Derwent Pub., Ltd., London, GB, XP002141177 & CN 1 225 898 A.
Weiping Cai et al., *J. of Materials Science Letters*, Nov. 15, 1999, Kluwer Academic Publishers, USA, vol. 18, No. 22, pp. 1849–1851, XP000869127.
Whilton N. et al., *Advanced Materials*, Aug. 2, 1999, vol. 11, No. 12, pp. 1014–1018, XP002141176.
M. Wark et al., *Zeolites*, vol. 97, 1995, pp. 205–212, XP000921298, Elsevier Publishing, US.

*Primary Examiner*—Deborah Jones
*Assistant Examiner*—Ling Xu
(74) *Attorney, Agent, or Firm*—Burns, Doane, Swecker & Mathis, L.L.P.

(57) ABSTRACT

The invention concerns a heat-stable ordered mesoporous or mesostructured material comprising a mineral phase wherein are dispersed particles of nanometric dimension at least partly crystaline, the global crystallinity index of said mesostructured or ordered mesoporous material being less than 10% in volume. The invention also concern a method for obtaining such a material.

37 Claims, 3 Drawing Sheets

MESOSTRUCTURED MATERIAL INCORPORATING PARTICLES OF NANOMETRIC DIMENSIONS

RELATED APPLICATION DATA

This application is a National Stage application filed under 35 U.S.C. §371 of International Application No. PCT/FR00/03060 filed Nov. 2, 2000, and is based on and claims priority under 37 U.S.C. §119 to French Application No. 99/13678, filed Nov. 2, 1999, the entire contents of which are incorporated herein by reference.

FIELD OF THE DISCLOSURE

The present invention relates to a heat-stable ordered mesoporous or mesostructured material.

In the strict sense of the term, "mesoporous" materials are solids that have in their structure pores with a size that is intermediate between that of the micropores of materials of zeolite type and that of macroscopic pores.

More specifically, the expression "mesoporous material" originally denotes a material that specifically comprises pores with a mean diameter of between 2 and 50 nm, denoted by the term "mesopores". Typically, these compounds are compounds of amorphous or paracrystalline silica type in which the pores are generally randomly distributed, with a very broad pore size distribution.

STATE OF THE ART

As regards the description of such materials, reference may be made especially to *Science*, vol. 220, pp. 365371 (1983) or to *The Journal of Chemical Society, Faraday Transactions*, 1, vol. 81, pp. 545–548 (1985).

Besides, as regards materials referred to as being "structured", these are materials with an organized structure, characterized more specifically by the fact that they show at least one scattering peak in a radiation scattering diagram of the X-ray scattering or neutron scattering type. Such scattering diagrams and the method for obtaining them are especially described in *Small Angle X-Rays Scattering* (Glatter and Kratky—Academic Press London—1982).

The scattering peak observed in this type of diagram can be associated with a repeat distance that is characteristic of the material under consideration, which will be denoted herein below in the present description as the "spatial repeat period" of the structured system.

On the basis of these definitions, the expression "mesostructured material" means a structured material with a spatial repeat period of between 2 and 50 nm.

Ordered mesoporous materials themselves constitute a special case of mesostructured materials. They are, in fact, mesoporous materials that have an organized spatial arrangement of the mesopores present in their structure, and that as a result effectively have a spatial repeat period associated with the appearance of a peak in a scattering diagram.

The family of materials with the generic name "M41S", described especially by Kresge et al. in *Nature*, vol. 359, pp. 710–712 (1992) or by Q. Huo et al. in *Nature*, vol. 368, pp. 317–321 (1994) constitutes the most widely known example of ordered mesostructured and mesoporous materials: they are silicas or aluminosilicates whose structure is formed from two-dimensional or three-dimensional channels ordered in a hexagonal (MCM-41) or cubic (MCM-48) arrangement, or which have a vesicular or lamellar structure (MCM-50).

It should be noted that, although they consist of a structure containing channels rather than mesopores, the compounds known as MCM-41 and MCM-48 are generally described in the literature as being ordered mesoporous materials. For example, Fengxi Chen et al. specifically describe, in Chemicals Materials, vol. 9, No. 12, p. 2685 (1997), the channels present in these structures as "two-dimensional or three-dimensional mesopores".

On the other hand, materials with a vesicular or lamellar structure of MCM-50 type cannot for their part be likened to mesoporous structures, since their porous parts cannot be considered as mesopores. They will therefore be denoted solely as mesostructured materials in the rest of the description.

Ordered mesoporous and mesostructured materials of the M41S type are generally obtained by a process known as "liquid crystal templating", usually denoted by the initials "LCT". This LCT process consists in forming a mineral matrix such as a silica or aluminosilicate gel in the presence of amphiphilic compounds of surfactant type.

The expression "liquid crystal templating" arises from the fact that it may be considered schematically that the liquid crystal structure initially adopted by the surfactant molecules sets the mineral matrix in its final shape.

Thus, it may be considered that, within the liquid crystal structure, the mineral precursors are located on the hydrophilic portions of the amphiphilic compounds before being condensed together, which gives the mineral matrix finally obtained a spatial arrangement that is an exact copy of that of the liquid crystal. By removing the surfactant, especially by heat treatment or entrainment with a solvent, an ordered mesostructured or mesoporous material is obtained, which constitutes the imprint of the initial liquid crystal structure.

Beck et al. in *The Journal of American Chemical Society*, vol. 114, p. 10834 (1992) thus explain the honeycomb structure of MCM-41 by the initial organization of the surfactant molecules in the form of a liquid crystal phase of hexagonal type.

It appears, however, as shown by Davis et al. in *Microporous Materials*, vol. 2, p. 27 (1993) that the mechanism involved is a little more complex. In fact, it proceeds in a first stage by the formation of composite species consisting of micelles coated with mineral precursors that become organized, in a second step, into a hexagonal, cubic or lamellar network. However, the fact nevertheless remains that the final arrangement of the mineral matrix obtained is clearly governed by the initial shape of the micelles formed by the amphiphilic molecules used, which justifies the name "LCT" and the fact that the term "templating agent" is generally used to denote amphiphilic compounds of surfactant type used in this process.

Given their high specific surface area and their particular structure, the ordered mesostructured or mesoporous materials thus obtained are very advantageous, especially in the field of catalysis, absorption chemistry or membrane separation.

Nevertheless, in order to adapt them as best possible to these various applications, it was rapidly sought to modify them so as to increase their stability, especially their heat stability, and to improve their efficacy in these various fields.

By varying the nature of the templating system used, a change in the structure of the mineral matrix obtained was observed. Studies by Tanev et al., inter alia, have for example demonstrated the fact that the pore size depends on the length of the hydrophobic chain in the amphiphilic compounds used (*Science*, vol. 267, pp. 865–867, 1995).

However, they have above all shown that the passage from an ionic surfactant to an uncharged templating agent leads to a process known as "neutral templating". This process induces a considerable increase in the thickness of the walls of the mesostructures, which leads especially to an improvement in the stability of the compound obtained.

However, in order to obtain mesostructured materials that are really advantageous, it is not sufficient to control these structural parameters alone.

Specifically, the industrial development of mesostructured materials is currently conditioned by other imperatives regarding the very constitution of the mineral matrix, and especially its degree of crystallinity and its chemical nature.

Now, mesostructured materials generally consist of an amorphous or paracrystalline mineral matrix, of silica, aluminosilicate or alumina type, and an improvement in the degree of crystallinity of these compounds has not been described. Furthermore, the attempts made to obtain mesoporous materials based on different constituents, for instance niobium salts, lead in principle only to compounds of low stability, which prohibits their use on an industrial scale.

A sufficiently stable ordered mesoporous structure can therefore currently be obtained only by using a limited number of chemical compounds, of silica and/or alumina type. As a result, the incorporation into an ordered mesoporous structure of chemical compounds capable of inducing specific properties cannot be performed in a large number of cases.

The present invention provides a solution to this technical problem.

Specifically, the present invention aims at providing mesostructured materials, or materials with an ordered mesoporous structure, which especially gives them a high specific surface area.

Moreover, a second aim of the invention is to provide mesostructured materials that have, in addition to an order as regards the arrangement of their pores, a large intrinsic degree of crystallinity of the walls of the structure.

Finally, another aim of the invention is to incorporate within the matrix of a mesoporous structure, chemical compounds with particular intrinsic properties, which are capable of inducing specific properties, but which do not, however, affect the stability of the structure obtained.

More specifically, one subject of the present invention is a heat-stable ordered mesoporous or mesostructured material comprising a mineral phase, in which phase are dispersed at least partially crystalline particles of nanometric size, the overall degree of crystallinity of said ordered mesoporous or mesostructured material being at least 10% by volume.

Advantageously, the ordered mesoporous or mesostructured materials of the present invention are solids having, at least locally, one or more mesostructure(s) chosen from:

mesoporous mesostructures of three-dimensional hexagonal symmetry P63/mmc, of two-dimensional hexagonal symmetry P6 mm, of three-dimensional cubic symmetry Ia3d, Im3m or Pn3m; or mesostructures of vesicular or lamellar type.

As regards the definition of these various symmetries and structures, reference may be made, for example, to *Chemical Materials*, vol. 9, No. 12, pp. 2685–2686 (1997) or to *Nature*, vol. 398, pp. 223–226 (1999).

According to the invention, an ordered mesoporous or mesostructured material is considered as being heat-stable since its mesostructure is conserved up to a temperature of at least 500° C., which may range up to 700° C. or even up to 800° C., and in certain cases up to a temperature above 800° C.

In this respect, it should be noted that the exposure of ordered mesoporous or mesostructured structures to high temperatures generally leads to an embrittlement of these materials, especially due to the reduction in the thickness of the walls of their mesostructure, which can lead to a collapse of said structure.

The present invention makes it possible, surprisingly, to provide very heat-stable compounds.

For the purposes of the present invention, the expression "particles of nanometric size" means particles of spherical or anisotropic morphology, at least 50% of the population of which has a mean diameter of between 1 and 10 nm, with a particle size distribution of these particles that is preferably monodisperse.

Specifically, the expression "particles of nanometric size" can also denote according to the invention highly anisotropic particles, of stick type, provided that, for at least 50% of the population of these particles, the mean transverse diameter is between 1 and 10 nm and the length does not exceed 100 nm, with a particle size distribution of these particles that is preferably monodisperse.

The particles of nanometric size used according to the present invention are at least partially crystalline particles, that is to say that they have a degree of crystallinity ranging from 30 to 100% by volume. The introduction of these partially crystalline particles into the mineral phase makes it possible to give the mesostructured materials of the invention, in addition to an ordered arrangement of their pore network, an overall degree of crystallinity at least equal to 10% by volume and preferably greater than 30% by volume.

For the purposes of the invention, the expression "overall degree of crystallinity" means the degree of crystallinity of the walls of the structure, which globally takes into account both the possible crystallinity of the binding mineral phase and the crystallinity of the particles of nanometric size included in this binding phase. It should thus be noted that, for the purposes of the invention, the notion of crystallinity of the material relates specifically to the intrinsic crystallinity of the walls of the material and that, as a result, it should especially be distinguished from the order presented at a more macroscopic level by the pore network of the mesoporous structure.

Preferentially, the particles of nanometric size incorporated into the binding mineral phase of the materials of the invention are particles based on one or more oxide(s), hydroxide(s) or oxyhydroxide(s) of a metal or metals chosen from cerium, zirconium, titanium, aluminum, yttrium, lanthanides and transition metals such as, for example, iron, chromium, vanadium, manganese, cobalt, nickel, copper or zinc.

The term "lanthanide" means a metal whose atomic number is between 57 (lanthanum) and 71 (lutetium), inclusive.

Advantageously, these particles of nanometric size are particles based on at least one compound chosen from cerium oxide $CeO_2$, zirconium oxide $ZrO_2$, titanium oxide $TiO_2$, alumina $Al_2O_3$, aluminum oxyhydroxide $AlO(OH)$, lanthanum oxide $La_2O_3$ and iron oxide $Fe_3O_4$.

These particles of nanometric size are well known to those skilled in the art and the methods for obtaining them have been widely described in the prior art. Thus, cerium oxide particles that are useful according to the invention may be, for example, particles of the type observed, for example, in the colloidal dispersions (cerium sols) described especially in patent applications FR 2 416 867, EP 0 206 906 or EP 208 580. As regards the zirconium oxide particles, reference may be made especially to *The Journal of Gel Science Technology*, vol. 1, p. 223 (1994). Mention may also be made of the article from Chemical Materials, vol. 10, pp. 3217–3223 (1998) as regards nanometric titanium oxide particles.

As regards the mineral phase of the mesostructured material of the present invention incorporating the particles of nanometric size defined above it constitutes an amorphous to partially crystalline mineral phase, preferably consisting of silica, alumina or silicate of one or more metals.

Irrespective of its exact nature, it should be pointed out that, in the material of the invention, the mineral phase acts specifically as a binder between the particles of nanometric size. In other words, the particles of nanometric size present in the material are specifically located in this binding phase, that is to say in the walls of the mesoporous structure. In particular, it should thus be pointed out that the materials according to the invention should especially be distinguished from mesoporous materials including particles in the internal space of their pores.

Furthermore, it should be noted that, preferentially, the chemical nature of this binding mineral phase is different from that of the particles it contains.

In addition, it is often preferred that at least some of the particles incorporated into the binding mineral phase should be in contact with the porous parts constituting the internal space of the material. In other words, the material according to the invention is preferably a material in which the mineral phase acts effectively as an interparticulate binder, but does not totally encompass the particles of nanometric size that it contains.

The presence within the mineral matrix of these at least partially crystalline particles has the twofold advantage of, on the one hand, improving the overall degree of crystallinity of the material, and on the other hand, of giving the material specific properties, especially mechanical, catalytic or photocatalytic properties, or adsorption, heat conduction or electronic conduction properties, due to the presence of the metal oxide, hydroxide or oxyhydroxide.

It is important to consider the paramount role of interparticulate consolidation of the mineral phase. Specifically, in order to promote the formation of a structure in which the particles are partially exposed, one would be tempted in principle to greatly reduce the binding mineral phase/particle ratio. However, it appears that the stability of the structure is not generally assured when the mineral matrix/particle molar ratio is below a proportion of 20:80.

As a result, the mineral matrix/particle of nanometric size molar ratio in the materials according to the invention is advantageously between 20:80 and 99.5:0.5 and advantageously between 40:60 and 95:5. Even more preferably, this molar ratio is between 40:60 and 92:8.

According to the invention, the overall thickness of the walls of the mesoporous structure, which incorporate the particles of nanometric size, is preferably between 3 and 12 nm.

Moreover, the materials of the invention have a high specific surface area, which is preferentially between 400 and 1500 m$^2$/g.

In the case of an ordered mesoporous structure, the pore diameter is generally between 2 and 8 nm. However, this diameter may be further increased, especially by using solvents, by techniques known in the prior art.

According to a second aspect, a subject of the invention is also a process for preparing a partially crystalline organized mesoporous material comprising a mineral phase in which are dispersed particles of nanometric size. This process is characterized in that it comprises the steps consisting in:

(1) forming an initial medium comprising a templating agent;

(2) adding to said medium a colloidal dispersion of particles of nanometric size;

(3) forming, by adding a mineral precursor to the medium, a mineral phase with an organized mesostructure, said mineral phase incorporating, in the walls of this structure, said particles of nanometric size; and (4) removing the structuring agent.

The initial medium formed during step (1) is preferably an aqueous medium, but it may also be an aqueous-alcoholic medium, and preferably, in this case, a water/ethanol medium, or alternatively a nonaqueous medium and, where appropriate, advantageously a chloroform or tetrahydrofuran medium.

It is recalled that the templating agent present in this initial medium is an amphiphilic compound of surfactant type, especially a copolymer. The essential characteristic of this compound is that it is capable of forming micelles in the reaction medium, so as to lead, by carrying out the "LCT" templating mechanism defined above, to the formation, during the subsequent step (3), of a mineral matrix with an organized mesostructure.

However, in order to carry out a neutral templating process that has the advantage of leading, as has been pointed out previously, to an increase in the thickness of the walls obtained and thus to an improvement in the stability of the final structure, the templating agent used in the process according to the invention is preferentially a compound that is not charged under the conditions for carrying out the process.

Preferably, but in a nonlimiting manner, the pH of the initial medium is less than 4.

Although any amphiphilic compound that is uncharged under these pH conditions can be used as a templating agent in the process of the invention, it is preferred to use certain specific types of compound. As a nonlimiting guide, mention will be made of the following amphiphilic compounds:

In the case of a process performed in aqueous or aqueous-alcoholic medium, the templating agent used is preferably a nonionic surfactant of block copolymer type, and more preferably a poly(ethylene oxide)-poly(propylene oxide)-poly(ethylene oxide) triblock copolymer known as PEO-PPO-PEO or $(EO)_x$-$(PO)_y$-$(EO)_z$, of the type such as those described especially by Zhao et al. in *The Journal of the American Chemical Society*, vol. 120, pp. 6024–6036 (1998), and sold under the generic brand name PLURONIC® by BASF. Advantageously, nonionic surfactants such as the grafted poly(ethylene oxides) $(EO)_xC_y$ sold by Aldrich under the brand names BRIJ® or TWEEN®, or alternatively nonionic surfactants with a sorbitan head, of the type such as those sold by Fluka under the brand name SPAN®, may also be used. as regards the case of a process performed in nonaqueous medium, and in particular in the case of a tetrahydrofuran medium, the templating agent is advantageously a poly(ethylene oxide)-poly(isoprene) block copolymer of the type such as that described especially in *Science*, vol. 278, p. 1795 (1997).

The colloidal dispersion introduced during step (2) of the process of the invention is preferably a stable suspension comprising colloidal particles for which the hydrodynamic diameter of at least 50% of the population is preferably between 1 and 15 nm, with a preferentially monodisperse particle size distribution of these colloidal particles.

Advantageously, the colloidal particles used are particles based on one or more oxide(s), hydroxide(s) or oxyhydroxide(s) of one or more metals chosen from cerium, zirconium, titanium, aluminum, yttrium, transition metals and lanthanides, and advantageously based on at least one compound chosen from cerium oxide $CeO_2$, zirconium oxide $ZrO_2$, titanium oxide $TiO_2$, alumina $Al_2O_3$, aluminum oxyhydroxide AlO(OH), lanthanum oxide $Ln_2O_3$ and iron oxide $Fe_3O_4$.

These stable colloidal suspensions are of the type such as those described especially in patents EP 206 906 and EP 208 580, or alternatively in Chemical Materials, vol. 10, pp. 3217–3223 (1998). These suspensions may also be obtained especially by acidic treatment, washing or dispersion of ultrafine powders obtained, for example, by high-temperature synthesis processes of the type such as combustion of metal chlorides in a flame, which are known to those skilled in the art.

Preferably, the particle concentration in the suspensions used according to the invention is greater than 1M.

It should moreover be noted that, depending on the medium used, the surface of the particles of nanometric size used can optionally be modified, so as to stabilize the dispersion and to avoid flocculation of the colloidal suspension introduced into the initial medium. This stabilization may especially be performed by an acidic treatment.

The mineral precursor used in step (3) of the process of the invention depends on the mineral phase that it is desired to form in order to ensure the interparticulate bonding within the final material.

Advantageously, the binding mineral phase formed after adding the mineral precursor in step (3) consists of silica, alumina or aluminosilicate.

In the case of formation of a binding mineral phase of silica, the mineral precursor used may especially be a compound of silicate or alkoxide type and especially a sodium silicate or silicon alkoxide. In this case, a condensation catalyst in the form of a strong acid of hydrochloric acid type is generally added to the initial medium.

In the case of formation of a mineral phase of alumina or aluminosilicate type, a compound of alkoxide type is preferably used.

It should moreover be noted that, in the most general case, the process is advantageously performed at room temperature or at a temperature above room temperature, preferably at a temperature of between 20° C. and 90° C. and particularly preferably between 20° C. and 35° C. It is within the competence of a person skilled in the art to adapt this temperature parameter as a function of the nature of the templating agent used and of the spatial arrangement of the ordered mesoporous material that it is desired to obtain, as a function of the phase diagram presented by the structuring agent used.

In practice, step (3) of adding the mineral precursor is generally followed by a maturation stage, the duration of which can vary between 5 minutes and 3 days and is preferably of the order of a few hours. This maturation step is advantageously performed at a temperature of between 20° C. and 90° C.

After this optional maturation step, a mesostructured solid is obtained, the porous portions of which are occupied by molecules of templating agent. The material obtained can optionally be subjected to a step of washing with a solvent, especially with water or with an organic solvent, and/or a drying step.

In order to obtain a material of porous mesostructure, the solid thus obtained is then subjected to step (4) of removing the templating agent.

This step may be performed especially by a heat treatment. In this case, the heat treatment is advantageously performed according to a profile of temperature increase of between 0.2° C. per minute and 3° C. per minute, and preferably according to a profile of temperature increase of between 0.5° C. per minute and 2° C. per minute, so as not to degrade the material. This temperature increase is generally performed up to a temperature allowing the removal of the templating agent, preferably up to a temperature of 500° C.

Moreover, the removal of the solvent may also be performed by entrainment with a solvent. It should be noted that entrainment with a solvent is facilitated by the fact that an uncharged amphiphilic compound is preferably used, which induces a templating agent-matrix interaction that is weak enough to allow this type of removal.

Advantageously, the solid obtained after these various steps may also be subjected to an additional heat treatment, and especially to a calcination. The aim of this optional additional heat treatment is to increase the crystallinity of the material obtained.

However, it is known from the prior art that such a heat treatment of a mesostructured material induces, on the one hand, a local mechanical consolidation of the walls of the material, but also, on the other hand, a reduction in the thickness of these walls, generally inducing an overall embrittlement of the mesostructure obtained.

Depending on the compositions of the binding mineral phase and of the particles of nanometric size used, it is within the competence of a person skilled in the art to adapt the heat treatment to which the material is subjected so as to achieve an increase in the crystallinity of the material, without, however, harming its final stability.

However, it should be noted that this increase in crystallinity by heat treatment without excessive embrittlement of the material is far easier to achieve in the case of the mesostructured materials of the present invention than in the case of the highly unstable mesostructured materials described elsewhere in the prior art.

Specifically, the particular process carried out in the present invention, and also the specific use of at least partially crystalline particles in the production of the materials of the invention leads, after the step of removing the templating agent, to mesostructured materials whose walls are very much thicker than in the case of standard mesostructures. In fact, the present invention makes it possible to obtain extremely stable mesostructured materials which, even after heat treatment, have high mineral wall thicknesses, generally of between 3 and 12 nm.

Furthermore, due to the fact of using at least partially crystalline particles and of the possibility of further increasing the crystallinity of the material by heat treatment, it is even possible to achieve the preparation, according to the process of the present invention, of materials having in certain cases a degree of crystallinity of at least 90%.

Moreover, it should be noted that, when the particles and the binding mineral phase that contains them are of different chemical nature, a reaction can take place between the two chemical species present, during the optional heat treatment step. The consequence of this reaction is to change the chemical nature of the mineral phase. Thus, in the case of a material comprising, for example, before calcination, particles of a metal oxide other than silicon in a mineral phase of silica type, the heat treatment can lead in certain cases to the formation of a metal silicate within the mineral phase.

Finally, it still remains to be pointed out that, in certain cases, it may arise that the particles of nanometric size obtained are entirely coated with the mineral matrix. If it is desired that, in the final material, the particles should not be totally encompassed by the matrix, the material obtained may also be subjected to a partial chemical attack of the mineral phase, especially with alkaline compounds of the $NH_4OH$ or NaOH type, or alternatively with hydrofluoric acid. In this case, it is within the competence of a person skilled in the art to adjust the concentration of hydroxide or fluoride ions and also the duration of the treatment so as to control the dissolution of the mineral phase. Under these conditions, the post-treatment makes it possible to expose at least a portion of the particles incorporated into the material, without, however, embrittling the structure of the final material.

Given their characteristics, the materials of the invention may be used in many fields of application, and in particular in the fields of catalysis, absorption chemistry or membrane separation.

BRIEF DESCRIPTION OF THE DRAWING FIGURES

The various advantages of the present invention will emerge even more explicitly in the light of the implementation examples of the invention which follow and of FIGS. 1, 2 and 3 included in the annex.

DETAILED DESCRIPTION

Figure 1:
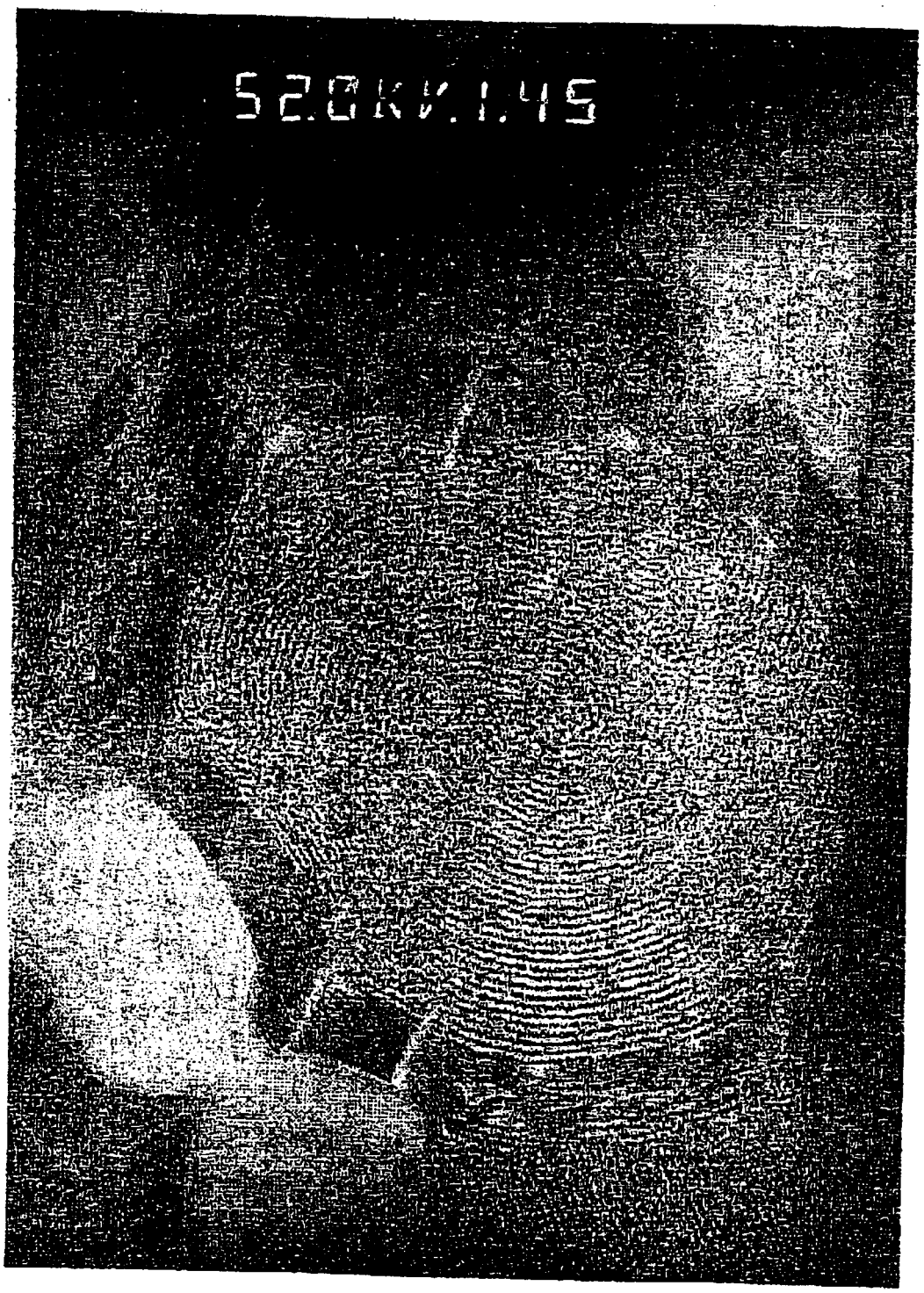
FIG. 1 is a photograph obtained by transmission electron microscopy on a sample of a silica/cerium particle mesostructured material characterized by a silica/cerium molar ratio of 80:20 and subjected to ultramicrotomy (magnification:×104 000).

Examples 1 to 3 presented below concern the preparation of mesostructured compounds according to the invention, consisting of cerium oxide $CeO_2$ particles of nanometric size incorporated into a silica binding mineral phase and vary with respect to each other only in the silica/cerium oxide molar ratio of the compound obtained. Example 4 relates to the preparation of a mesostructured compound according to the invention comprising anisotropic particles based on AlOOH dispersed in a silica binding matrix.

EXAMPLE 1

Preparation of a Silica/Cerium Particle Mesostructured Material Characterized by a Silica/Cerium Molar Ratio of 90:10

Step 1: Preparation of an aqueous colloidal dispersion (D).

An aqueous dispersion of crystalline colloids of cerium oxide $CeO_2$ with a diameter of about 5 nm was obtained by carrying out the following steps:

a $CeO_2$ precipitate was first prepared according to the process of thermal hydrolysis at 100° C. of partially neutralized ceric nitrate solutions, described in patent application EP 208 580.

250 g of this thermal hydrolysis precipitate containing 68.6% $CeO_2$ were then redispersed in 200 g of demineralized water, and then left to stand overnight at room temperature.

the mixture was centrifuged at 4500 revolutions per minute for 15 minutes, and the supernatant portion was then washed and concentrated by ultrafiltration on a 3 KD membrane.

The concentration of the colloidal dispersion thus obtained is 43% by weight or 4.15 M as $CeO_2$.

Step 2: Preparation of the $SiO_2/CeO_2$ mesostructured compound (1) 2 g of Pluronics P123($PEO_{(20)}$-$PPO_{(70)}$-$PEO_{(20)}$ copolymer) from the company BASF and 58.1 g of demineralized water were placed in a reactor at room temperature. 16.9 g of an HCl solution at 2 mol/liter were then added. The mixture was stirred using a Teflon-coated magnetic bar. The medium thus obtained was maintained at 37° C.

(2) 0.79 g of the colloidal dispersion (D) prepared above was added instantaneously with stirring.

(3) 3.83 g of TEOS (tetraethyl orthosilicate, MW=208 g) were then added at a constant rate over one hour with the aid of a pump (KDS syringe-driver).

The molar ratio ($SiO_2/CeO_2$) introduced is 90:10.

The reaction mixture was stirred at a temperature of 37° C. for 20 hours. The dispersion obtained was then transferred into a sealed container and then placed in an oven at 80° C. overnight.

The solid product was recovered by centrifugation at 4500 revolutions per minute and then washed with a volume of demineralized water equivalent to the initial volume of the reaction mixture.

After separation by centrifugation, the solid product was dried at room temperature under an atmosphere of air.

(4) The product was then calcined at temperature (500° C.) for 6 hours.

The temperature increase used was 1° C./minute.

By measurements of BET adsorption with nitrogen, the specific surface area measured for the mesostructured compound obtained is 919 $m^2/g$ and the pore volume is 0.96 ml/g. The mesopore size is 4 nm.

EXAMPLE 2

Preparation of a Silica/Cerium Particle Mesostructured Material Characterized by a Silica/Cerium Molar Ratio of 80:20

An aqueous colloidal dispersion (D) of crystalline $CeO_2$ colloids with a diameter of about 5 nm, defined above, was first prepared in the same manner as in Example 1.

Preparation of the $SiO_2/CeO_2$ mesostructured compound 2 g of Pluronics P123($PEO_{(20)}$-$PPO_{(70)}$-$PEO_{(20)}$ copolymer) from the company BASF and 58.1 g of demineralized water were placed in a reactor at room temperature. 16.9 g of an HCl solution at 2 mol/liter were then added. The mixture was stirred using a Teflon-coated magnetic bar. The medium thus obtained was maintained at 37-C.

(2) 1.63 g of the colloidal dispersion (D) prepared above was added instantaneously with stirring.

(3) 3.40 g of TEOS (tetraethyl orthosilicate, MW=208 g) were then added at a constant rate over one hour with the aid of a pump (KDS syringe-driver).

The molar ratio ($SiO_2/CeO_2$) introduced is 80:20.

The reaction mixture was stirred at a temperature of 370° C. for 20 hours. The dispersion obtained was then transferred into a sealed container and then placed in an oven at 80° C. overnight.

The solid product was recovered by centrifugation at 4500 revolutions per minute and then washed with a volume of demineralized water equivalent to the initial volume of the reaction mixture.

After separation by centrifugation, the solid product was dried at room temperature under an atmosphere of air.

(4) The product was then calcined at temperature (500° C.) for 6 hours.

The temperature increase used was 1° C. minute.

By measurements of BET adsorption with nitrogen, the specific surface area measured for the mesostructured compound obtained is 1306 $m^2/g$ and the pore volume is 1 ml/g. The mesopore size is 4 nm.

Figure 2:
FIG. 2 is a photograph obtained by transmission electron microscopy on another sample of a silica/cerium particle mesostructured material also characterized by a silica/cerium molar ratio of 80:20 and subjected to ultramicrotomy (magnification:×180 000).

By transmission electron microscopy on samples subjected to ultramicrotomy, vesicular mesostructures with a characteristic "onion" structure (see, for example, FIG. 1) and also mesostructures with hexagonal symmetry (see especially FIG. 2) are observed.

In the case of a hexagonal pore network, the center-to-center distance determined for the pores is of the order of 12 nm, which suggests a wall thickness of the order of 8 nm.

At high resolution, entirely crystalline particles of $CeO_2$ incorporated into the walls of the mesoporous structure are distinguished. By localized chemical analysis, it is shown that these $CeO_2$ particles are fully dispersed in the $SiO_2$ walls.

EXAMPLE 3

Preparation of a Silica/Cerium Particle Mesostructured Material Characterized by a Silica/Cerium Molar Ratio of 50:50

An aqueous colloidal dispersion (D) of crystalline $CeO_2$ colloids with a diameter of about 5 nm, defined above, was first prepared in the same manner as in example 1 and example 2.

Preparation of the $SiO_{21}CeO_2$ mesostructured compound (1) 2 g of Pluronics P123($PEO_{(20)}$-$PPO_{(70)}$-$PEO_{(20)}$ copolymer) from the company BASF and 58.1 g of demineralized water were placed in a reactor at room temperature. 16.9 g of an HCl solution at 2 mol/liter were then added. The mixture was stirred using a Teflon-coated magnetic bar. The medium thus obtained was maintained at 37° C.

(2) 4 g of the colloidal dispersion (D) prepared above were added instantaneously with stirring.

(3) 2.08 g of TEOS (tetraethyl orthosilicate, MW=208 g) were then added at a constant rate over one hour with the aid of a pump (KDS syringe-driver).

The molar ratio ($SiO_2/CeO_2$) introduced is 50:50.

The reaction mixture was stirred at a temperature of 37° C. for 20 hours. The dispersion obtained was then transferred into a sealed container and then placed in an oven at 80° C. overnight.

The solid product was recovered by centrifugation at 4500 revolutions per minute and then washed with a volume of demineralized water equivalent to the initial volume of the reaction mixture.

After separation by centrifugation, the solid product was dried at room temperature under an atmosphere of air.

(4) The product was then calcined at temperature (500° C.) for 6 hours. The temperature increase used was 1° C. minute.

By measurements of BET adsorption with nitrogen, the specific surface area measured for the mesostructured compound obtained is 534 $m^2/g$ and the pore volume is 0.37 ml/g. The mesopore size is 4 nm.

Figure 3:
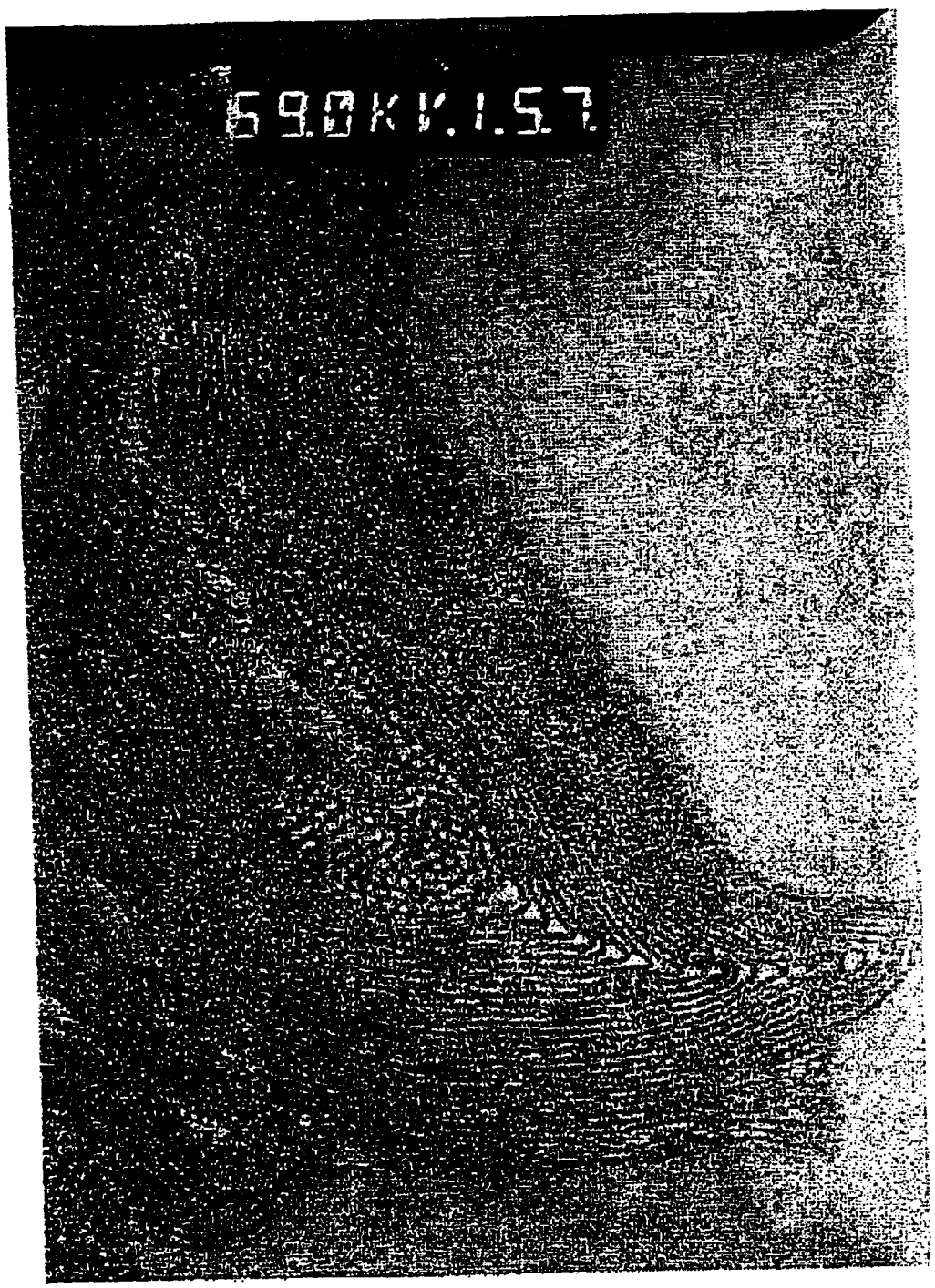
FIG. 3 is a photograph obtained by transmission electron microscopy on a sample of a silica/cerium particle mesostructured material characterized by a silica/cerium molar ratio of 80:20 and subjected to ultramicrotomy (magnification:×140 000).

By transmission electron microscopy on samples subjected to ultramicrotomy, an ordered template of the material is observed (see, for example, FIG. 3).

In the mesosporous structure observed in FIG. 3, the center-to-center distance determined for the pores is of the order of 14 nm, which suggests a wall thickness of the order of 10 nm.

At high resolution, entirely crystalline particles of $CeO_2$ incorporated into the walls of the mesoporous structure are distinguished. By localized chemical analysis, it is shown that these $CeO_2$ particles are fully dispersed in the $SiO_2$ walls.

EXAMPLE 4

Preparation of a Silica/AlOOH Particle Mesostructured Material Characterized by a Silica/Aluminum Molar Ratio of 91:9

Step 1: Preparation of a colloidal aqueous dispersion (D') of bohemite at 1.3 mol per liter of AlOOH.

An aqueous dispersion comprising crystalline AlOOH colloids is obtained by carrying out the following steps:

43 ml of 1M nitric acid were added to a beaker containing 957 ml of demineralized water. This mixture was stirred. 120 g of Condea bohemite (Plural 30120 grade at 87%) were then added by spatula and the medium was stirred vigorously for 30 minutes.

the medium obtained was then centrifuged for 20 minutes at 4500 revolutions per minute, after which the supernatant was drawn off by suction, taking care not to entrain the particles of the pellet.

By cryo-microscopy, the particles present in the colloidal dispersion of bohemite thus obtained were observed. These are anisotropic particles characterized by a mean length of 50 to 100 nm and mean transverse diameters of about 5 nm.

The dispersion (D') was obtained by adjusting the concentration of the colloidal dispersion of bohemite prepared above to 1.3 mol per liter of AlOOH, by addition of demineralized water.

Step 2: Preparation of the $SiO_2/Al_2O_3$ mesostructured compound (1) 10 g of Pluronics P123 ($PEO_{(20)}$-$PPO_{(70)}$-$PEO_{(20)}$ copolymer) from the company BASF and 310 g of demineralized water were placed in a reactor at room temperature. 84.5 g of an HCl solution at 2 mol/liter were then added. The mixture was placed under magnetic stirring at 25° C.

(2) 6.85 ml of the colloidal dispersion (D') of bohemite at 1.3 mol per liter in AlOOH, prepared in step 1, were then added instantaneously with stirring. The medium obtained was then maintained at 35° C.

(3) 1.91 g of TEOS (tetraethyl orthosilicate, MW=208 g) were then added at a constant rate over one hour using a pump (KDS syringe-driver).

The molar ratio ($SiO_2/CeO_2$) introduced is 91:9.

The reaction mixture was stirred at a temperature of 35° C. for 20 hours. The dispersion obtained was then transferred into a sealed container and then placed in an oven at 80° C. overnight.

The solid product was recovered by centrifugation at 4500 revolutions per minute for 10 minutes and was then washed with a volume of demineralized water equivalent to the initial volume of the reaction mixture.

After separation by centrifugation, the solid product was dried at room temperature under an atmosphere of air.

(4) The product was then calcined at temperature (500° C.) for 6 hours.

The temperature increase used was 1° C./minute.

By measurements of BET adsorption with nitrogen, the specific surface area measured for the mesostructured compound obtained is 1140 m$^2$/g and the pore volume is 1.27 cm$^3$/g. The mesopore size is 5 nm.

What is claimed is:

1. A heat-stable mesostructured material comprising a mineral phase, in which phase are dispersed at least partially crystalline particles of nanometric size, the overall degree of crystallinity of said mesostructured material being at least 10% by volume.

2. The mesostructured material of claim 1, which has, at least locally, one or more mesostructure(s) selected from the group consisting of:

mesoporous mesostructures of three-dimensional hexagonal symmetry P63/mmc, of two-dimensional hexagonal symmetry, of three-dimensional cubic symmetry 1a3d, 1m3m or Pn3m; and mesostructures of vesicular or lamellar type.

3. The mesostructured material of claim 1, wherein said particles of nanometric size are of spherical or anisotropic morphology particles, at least 50% of the population of which has a mean diameter of between 1 and 10 nm, the particle size distribution of said particles being monodisperse.

4. The mesostructured material of claim 1, wherein said particles of nanometric size are highly anisotropic particles, of stick type, at least 50% of the population of which has a mean transverse diameter of between 1 and 10 nm and a mean length not exceeding 100 nm, the particle size distribution of said particles being monodisperse.

5. The mesostructured material of claim 1, wherein said particles of nanometric size are particles with a degree of crystallinity of from 30 to 100% by volume.

6. The mesostructured material of claim 1, wherein said particles of nanometric size are particles based on one or more oxide(s), hydroxide(s) or oxyhydroxide(s) of one or more metals chosen from cerium, zirconium, titanium, aluminum, yttrium, transition metals and lanthanides.

7. The mesostructured material of claim 1, wherein said particles of nanometric size are particles based on at least one compound chosen from cerium oxide $CeO_2$, zirconium oxide $ZrO_2$, titanium oxide $TiO_2$, alumina $Al_2O_3$, aluminum oxyhydroxide AlO(OH), lanthanum oxide $La_2O_3$ and iron oxide $Fe_3O_4$.

8. The mesostructured material of claim 1, wherein said mineral phase is an amorphous to partially crystalline matrix, selected from the group consisting of silica, alumina and silicate of one or more metals.

9. The mesostructured material of claim 1, wherein the particles of nanometric size and the mineral phase incorporating these particles are of different chemical nature.

10. The mesostructured material of claim 1, wherein at least some of the particles of nanometric size dispersed in the mineral phase are in contact with the porous parts constituting the internal space of the material.

11. The mesostructured material of claim 1, wherein the mineral phase/particles of nanometric size molar ratio is between 20:80 and 99.5:0.5.

12. The mesostructured material of claim 11, wherein the mineral phase/particles of nanometric size molar ratio is between 40:60 and 95:5.

13. The mesostructured material of claim 1, wherein the overall thickness of the walls of the mesoporous structure, which incorporate the particles, is between 4 and 10 nm.

14. The mesostructured material of claim 1, having a specific surface area of between 400 and 1500 m$^2$/g.

15. The mesostructured material of claim 1, wherein said mesostructured material is an ordered mesoporous material.

16. The mesostructured material of claim 1, wherein the particles are located in walls of the mesostructure mineral phase, the mineral phase acting as a binder between said particles.

17. A mesostructured material comprising a templating agent in a porous part of the mesostructure, said material being susceptible to be obtained by a process comprising forming an initial medium comprising a templating agent; adding to said medium a colloidal dispersion of particles of nanometric size; forming, by adding a mineral precursor to the medium, a mineral phase with an organized mesostructure, said mineral phase incorporating, in the walls of this structure, said particles of nanometric size.

18. A process for preparing mesostructured material comprising a mineral phase in which are dispersed particles of nanometric size, comprising:

(1) forming an initial medium comprising a templating agent;

(2) adding to said medium a colloidal dispersion of particles of nanometric size;

(3) forming, by adding a mineral precursor to the medium, a mineral phase with an organized mesostructure, said mineral phase incorporating, in the walls of this structure, said particles of nanometric size; and (4) removing the structuring agent.

19. The process of claim 18, wherein the initial medium formed during step (1) is an aqueous medium.

20. The process of claim 18, wherein the initial medium formed during step (1) is an aqueous-alcoholic medium.

21. The process of claim 18, wherein the initial medium formed during step (1) is a non-aqueous medium.

22. The process of claim 18, wherein the pH of said initial medium is less than 4.

23. The process of claim 18, which is performed in aqueous or aqueous-alcoholic medium and wherein the templating agent used is a nonionic surfactant of block copolymer type, preferably chosen from poly(ethylene oxides)-poly(propylene oxide)-poly-(ethylene oxide) triblock copolymers and grafted poly(ethylene oxide) copolymers.

24. The process of claim 18, which is performed in non-aqueous medium, and wherein the templating agent used is a poly(ethylene oxide)-poly(isoprene) block copolymer.

25. The process of claim 18, wherein the colloidal dispersion introduced during step (2) of said process consists of a stable suspension comprising colloidal particles, at least 50% of the population of which has a hydrodynamic diameter of between 1 and 15 nm, the particle size distribution of said colloidal particles being monodisperse.

26. The process of claim 18, wherein the colloidal particles of the colloidal dispersion introduced during step (2) are particles based on one or more oxide(s), hydroxide(s) or oxyhydroxide(s) of one or more metals chosen from cerium, zirconium, titanium, aluminum, yttrium, transition metals and lanthanides.

27. The process of claim 18, wherein said colloidal particles are based on at least one compound selected from the group consisting of cerium oxide $CeO_2$, zirconium oxide $ZrO_2$, titanium oxide $TiO_2$, alumina $Al_2O_3$, aluminum oxyhydroxide AlO(OH), lanthanum oxide $Ln_2O_3$ and iron oxide $Fe_3O_4$.

28. The process of claim 18, wherein the particle concentration in the suspensions introduced during step (2) is greater than 1M.

29. The process of claim 18, wherein the surface of the colloidal particles of the colloidal dispersion introduced during step (2) is modified by an acidic treatment.

30. The process of claim 18, wherein the binding mineral phase formed after adding the mineral precursor in step (3) consists of silica, alumina or aluminosilicate.

31. The process of claim 30, wherein the mineral precursor introduced into the medium in step (3) is a silicate or an alkoxide.

32. The process of claim 18, which is performed at a temperature of between 20° C. and 90° C.

33. The process of claim 18, wherein step (3) of adding the mineral precursor is followed by a maturation stage.

34. The process of claim 18, wherein step (4) of removing the templating agent is performed by a heat treatment or by entrainment with a solvent.

35. The process of claim 18, wherein the mesostructured solid obtained is further subjected to a heat treatment.

36. The process of claim 35, wherein the heat treatment induces a change in the chemical structure of the binding mineral phase.

37. The process of claim 18, wherein the material obtained after step (4) is further subjected to a partial chemical attack of the mineral phase.

* * * * *